United States Patent [19]

Anthony

[11] 4,448,745
[45] May 15, 1984

[54] LATERAL SUPPORT FOR NUCLEAR FUEL ASSEMBLIES

[75] Inventor: Andrew J. Anthony, Tariffville, Conn.

[73] Assignee: Combustion Engineering, Inc., Windsor, Conn.

[21] Appl. No.: 365,753

[22] Filed: Apr. 5, 1982

[51] Int. Cl.³ .............................................. G21C 3/30
[52] U.S. Cl. .................................. 376/448; 376/438; 376/303; 376/444
[58] Field of Search ............... 376/448, 900, 434, 364, 376/302, 303, 442, 438, 285, 444, 439

[56] References Cited

U.S. PATENT DOCUMENTS

| | | | |
|---|---|---|---|
| 3,549,491 | 12/1970 | Johnson | 376/303 |
| 4,295,935 | 10/1981 | Anthony | 376/448 |
| 4,298,434 | 11/1981 | Anthony et al. | 376/364 |
| 4,304,635 | 12/1981 | Lippert et al. | 376/448 |
| 4,324,618 | 4/1982 | Schluderberg | 376/434 |
| 4,325,786 | 4/1982 | Wohlsen | 376/442 |

*Primary Examiner*—Harvey E. Behrend
*Attorney, Agent, or Firm*—Arthur L. Wade

[57] ABSTRACT

Nuclear fuel assemblies having square cross-sections mount tubes at each corner, the tubes containing springs which are extended through apertures in the tube walls when actuated by solid rods extended down into the tubes by the weight of the upper guide structure of the nuclear vessel in which the fuel assemblies are mounted. The springs, extended from strategically located positions along the length of the tubes, engage the surface of adjacent fuel assemblies to dimensionally stabilize the fuel assemblies relative to each other and the vessel in which they are mounted.

7 Claims, 8 Drawing Figures

LATERAL SUPPORT FOR NUCLEAR FUEL ASSEMBLIES

TECHNICAL FIELD

The present invention relates to structure with which nuclear fuel assemblies are maintained in their dimensional integrity and spatial relationship with adjacent fuel assemblies. More particularly, the present invention relates to spring structure actuated to protrude laterally from the fuel assembly into engagement with the surfaces of adjacent fuel assemblies when the closure of the nuclear reactor vessel is lowered into position.

BACKGROUND ART

Each of approximately 200 fuel assemblies in a modern pressurized water reactor (PWR) typically consists of a square array of fuel rods having external dimensions on the order of 8×8×160 inches (20×20×410 centimeters). In order to maximize neutron economy, it is highly desirable to make all structural components of the assembly from Zircaloy. In contrast, the reactor vessel internal structures, which support the fuel assemblies, are typically made from type 304 stainless steel.

During reactor operation, forces acting on the fuel assemblies tend to cause small lateral distortions of the fuel assembly structures. The only upper limit on the total magnitude of such distortions is the summation of the lateral clearances between the fuel assemblies. Assemblies having all Zircaloy structures are more susceptible to such deformation than those having stainless steel or Inconel structures because Zircaloy has a lower coefficient of expansion than the structures which position the upper and lower ends of the assemblies, thereby causing an increase of lateral clearance of as much as 50% in going from room temperature to operating temperature. Such distortions are undersirable because they may complicate refueling and they may introduce slight variations in local power density by virtue of the uneven water gap between assemblies.

One practice is to modify the grid constructions located at various planer levels down the length of the fuel assemblies to maintain dimensional stability and positional relationship between adjacent fuel assemblies. Regardless of what success may be obtained by grid modification in material and form, the present invention is directed toward obtaining the stability required by the use of spring structure exerting lateral forces which can be actuated upon closure of the nuclear vessel. This spring structure will be provided at locations which will give mechanical support between fuel assemblies when in use, and release the assemblies from spring contact with each other when the reactor vessel is open for inspection and replacement of fuel assemblies.

DISCLOSURE OF THE INVENTION

The present invention contemplates providing each fuel assembly with corner tubes having apertures spaced down the length of the tubes and springs mounted within the tubes which will be extended through the apertures when engaged by a rod moved down the inside of the tube.

The invention further contemplates the spring-actuating rod positioned by contact with the upper guide structure positioned in the vessel in which the fuel assemblies are mounted.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

General Discussion

Figure 1:
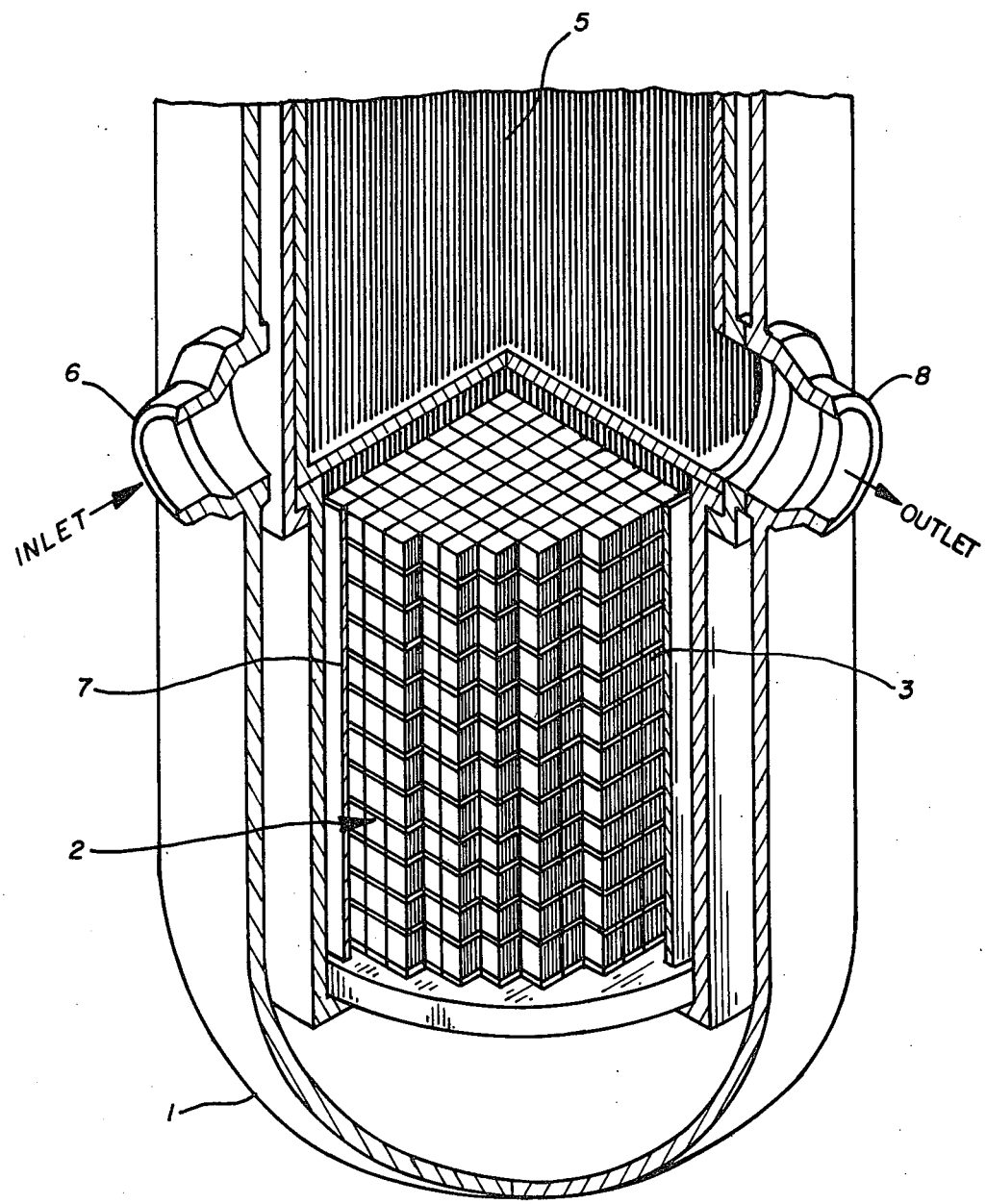
FIG. 1 is a sectioned elevation of the lower portion of a nuclear reactor vessel containing a core comprised of fuel assemblies in which the present invention is embodied.

The disclosure is organized to illustrate structures for lateral support of nuclear fuel assemblies within their core. The support for the fuel assembly is spaced at several planar regions of the core. Further, the support is automatically generated by placing the upper guide structure (U.G.S.) in position above the core. More specifically, the U.G.S. is arranged as a link between the vessel closure and the embodiment of the invention in the fuel assembly.

Lateral support loading is accomplished by means of leaf springs that are actuated by rods which are depressed by the fuel assembly hold down plate upon seating of the U.G.S. The springs and rods are located within each of four corner tubes of each fuel assembly. Therefore, the corner tubes and their rods are in positions formerly intended for fuel rods. The tubes are of zircaloy and square in cross section. In dimension, the tubes are in the order of $\frac{1}{2}$" square outside diameter and 29/64" square inside diameter, with a wall thickness in the order of 24 mil. The external surface of each corner tube may be "buff" oxidized to enhance its wear resistance. The leaf springs are of AM-350 material which has a high tensile strength, high resistance to irradiation-induced stress relaxation, good weldability, a lower neutron absorption cross section than other steels and inconel, and a thickness in the order of 25 to 35 mil. At least two spring mounting designs will be disclosed, one attached to the push rod and one attached to the corner tubes. Two or three springs may be mounted in each corner tube, with each spring at a spacer grid location. At any one spacer grid location there is a maximum of four springs, one per corner tube facing consecutively north, east, south and west. In any one corner tube the direction of the springs alternate such that if a lower spring faces north, the next spring above it faces west and the top (or next) spring faces north, etc.

The lateral support loading exerted by the springs on each fuel assembly is in the range of 150 to 400 lbs. per grid elevation, beginning of life cold (B.O.L.C.). By limiting the differential axial expansion of the spring, the (B.O.L.) hot spring load will not change. As a function of time, the load will change due to stress relaxation, creep, and growth of the grid with the net effect being a tolerable load reduction. However, a considerable analytic effort is required to optimize the lateral spring characteristics of the entire system.

When the invention is properly embodied in the structure of the fuel assembly, the following advantages are expected:

1. Bow in the fuel assemblies will be eliminated, along with the penalties associated with such bow.
2. Uniform gaps, or spacings, between assemblies will be maintained which will enable additional power capabilities to be attained, as well as eliminate the concern for effects which could cause fuel failure.
3. A better guidance system for handling the fuel assemblies will be possible and obviate the wear on perimeter fuel rods.
4. Fuel assemblies will be greatly strengthened by the corner tubes, as well as the springs generating their lateral forces.
5. A number of spacer grids may be eliminated and not compromise the integrity of the fuel assembly.
6. Seismic events will be tolerated better than with a special grid system and the pressure drop due to the grid system will be reduced.
7. Thinner wall guidance tubes are possible.
8. The CEA's will scram faster under all conditions,
9. The bottom lock down system will be more readily accommodated.

FIG. 1

Referring to FIG. 1, there is shown a typical arrangement within a nuclear reactor vessel 1 in sectioned elevation, including an active core 2 consisting of a plurality of adjacent nuclear fuel assemblies 3, a fuel assembly alignment plate which bears down on the spring-loaded hold-down plates on top of the fuel assemblies, and the upper guide structure assembly 5. The control rods which extend into the fuel assemblies of the core are not shown to avoid an over-cluttered drawing.

The vessel 1 is provided with an inlet port 6 through which the water to be heated by the core 2 is introduced into the vessel. This inlet flow of water is guided downward in the vessel around the core by a shroud 7. The core 2, suspended within the vessel 1, receives the inlet water at its lower end, the stream of water flowing up through the plurality of fuel assemblies which elevate the water temperature. Whether heated water, or steam, the fluid stream discharges from the upper end of the core and passes through outlet 8.

FIG. 1 serves to orient the core within the vessel 1. This core is held in its support by the upper guide structure 5 whose weight is directed downwardly on the upper end of the core. The present invention is concerned with structure provided for the fuel assemblies 3 of the core 2.

FUEL ASSEMBLY 3

Figure 2:
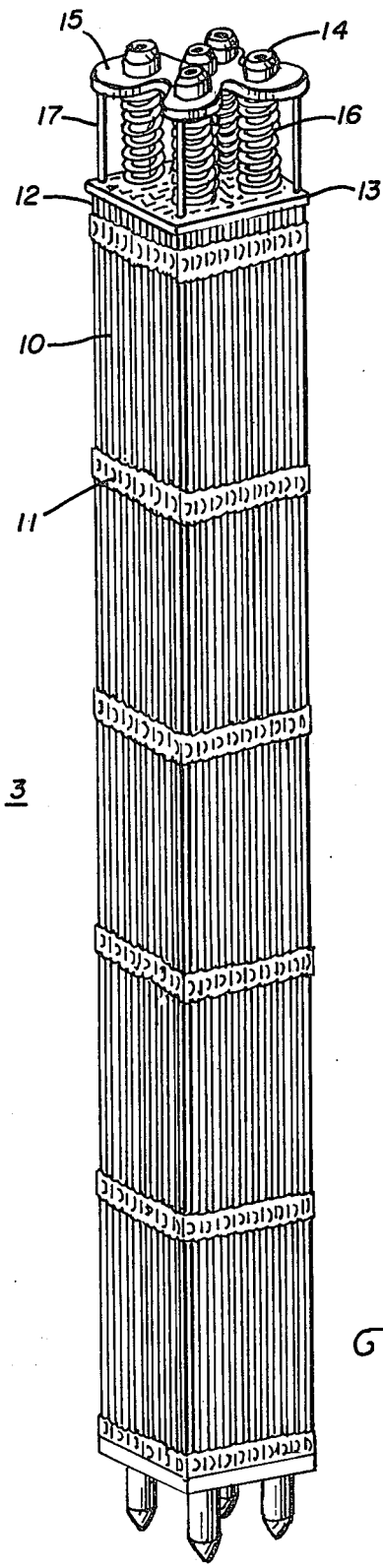
FIG. 2 is an elevation in perspective of one of the fuel assemblies of FIG. 1.

Referring to FIG. 2, one of the fuel assemblies 3 is shown in perspective elevation as oriented within core 2. The large number of fuel rods 10 are grouped in a framework of substantially square cross section. It is conventional to provide multiple spacer grids 11 along the length of the fuel assemblies to prevent displacement of the fuel rods by lateral forces. The design and arrangement of these spacer grids are not a part of the present inventive embodiment, and a number of them are shown here as normally included in all fuel assemblies.

At each of the four corners of the array of fuel rods, a square tube 12 is mounted in the position which would otherwise be occupied by a fuel rod. From these square tubes, the invention projects, or extends, a spring structure laterally to engage the external surface of a square tube in an adjacent fuel assembly. It is this spring force exerted at selected vertical stations along the length of the fuel assemblies which carries out the ultimate objective of the invention to maintain dimensional stability between the fuel assemblies.

FIG. 2 discloses a flow plate 13 at the upper end of the fuel assembly. Suitable apertures are provided through this flow plate as passages for the heated water, or steam, discharged from the top of the core. The CEA tubes 14 are disclosed extending above the flow plate 13 and through the hold-down plate 15. The control rods of the CEA are not shown within these tubes, as their presence would introduce a needless complication to the drawing. Springs 16 are shown about the upper end of each CEA tube 14 and extending between the flow plate 13 and hold-down plate 15, the hold-down plate moving vertically while spring loaded.

Within each square corner tube of the fuel assembly is a push rod 17 attached by its upper end to the hold-down plate 15. The conventional form of the hold-down plate 15 is modified to suitably attach to the upper ends of the push rods 17 so that as the hold-down plate 15 is forced downward by the upper guide structure, the push rods will travel down their respective tubes to actuate the spring structure embodying the present invention.

Figure 3:
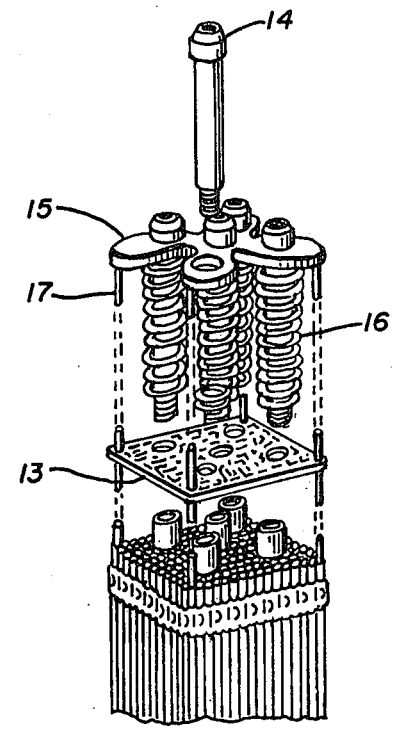
FIG. 3 is an exploded perspective of the upper end of the assembly of FIG. 2.

FIG. 3 is provided as supplemental to FIG. 2 in disclosing the structure at the upper end of the fuel assembly in an exploded convention. The flow plate 13 can be seen to have an aperture at each corner through which the push rods 17 reciprocate by reason of their attachment to the reciprocating hold-down plate 15. The springs 16 can be seen in position about the locking posts which form the upper ends of the CEA guide tubes. The hold-down plate 15 moves vertically against the spring force, the locking posts passing through suitable apertures in the hold-down plate. The complete arrangement, as disclosed in these two figures, provides actuation of the push rods in their respective corner tubes of the fuel assembly as the hold-down plate is moved.

Figure 4:
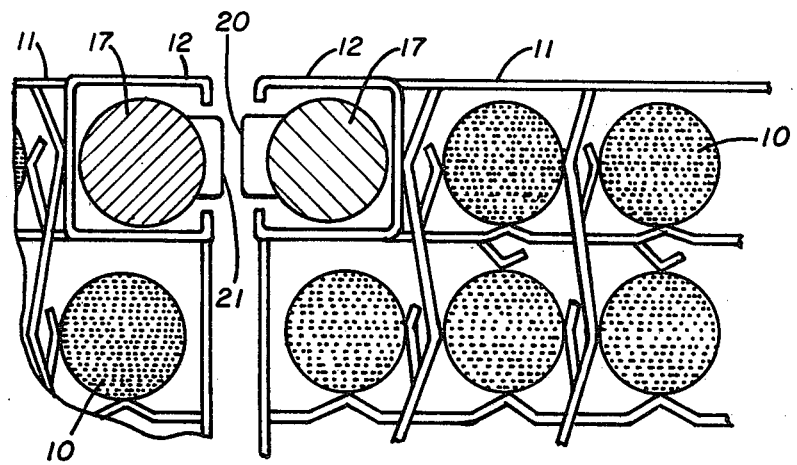
FIG. 4 is a plan view of a corner of the assembly of FIG. 2.

FIG. 4 is a sectioned elevation of one corner of the fuel assembly 3 along lines 4—4 in FIG. 2. This figure gives us a closeup sectional view of a square corner tube 12. Further, the figure shows the push rod 17 in place within tube 12. The ultimate objective of the arrangement is to project spring 20 laterally from tube 12 to engage the side of an adjacent square tube 21 mounted in a fuel assembly next to fuel assembly 3. The fuel rods 10 are disclosed as held by the framework of a spacer grid 11. Of course, this arrangement is repeated at each corner of the fuel assembly. The difference between the arrangements at each corner is in the direction the four springs 20 are projected. It is contemplated that the spring structure will be projected from each side of the fuel assembly to engage an adjacent fuel assembly. In this way, all of the fuel assemblies of the core are locked together with a degree of rigidity which will carry out the basic objective of the invention.

PUSH ROD AND SPRING ASSEMBLY

Figures 5, 6:
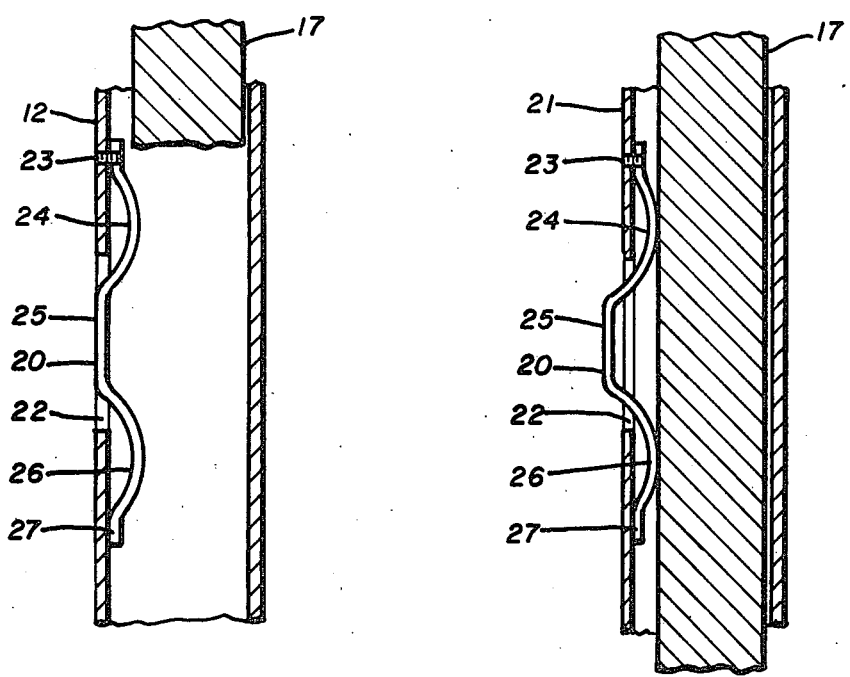
FIGS. 5 and 6 are sectioned elevations of a corner tube of the FIG. 2 assembly illustrating spring actuation.

FIGS. 5 and 6 disclose a representative square corner tube of fuel assembly 3. FIG. 5 shows the portion of the square tube 12 including an aperture 22. Spring 20 is mounted on the inside of the tube so that a portion of its mid-section will be projected laterally through aperture 22 when actuated by downward movement of push rod 17.

Many variations are available with which to attach spring 20 to the wall of the square tube 12. FIG. 5 discloses what presently appears to be the more simple arrangement in that the end 23 of spring 20 is rivited to the inside wall of the tube above the aperture and is shaped with a loop 24. Loop 24 extends into a pre-bowed mid-section 25 of the spring 20 which is opposite the aperture 22. Beyond the bowed mid-section 25 is a loop 25 similar to loop 24. The spring 20 terminates with an end 27 which may, or may not, be rivited to the inside wall of the tube. In this position of FIG. 5, the spring is poised for potential projection through the aperture 22 when loops 24 and 26 are distorted by the push rod. FIG. 6 discloses the push rod as having been forced down the tube to bear upon the loops 24 and 26 of the spring 20 until the mid-section of the spring has been pushed through the tube aperture far enough to engage the surface of an adjacent fuel assembly.

Figures 7, 8:
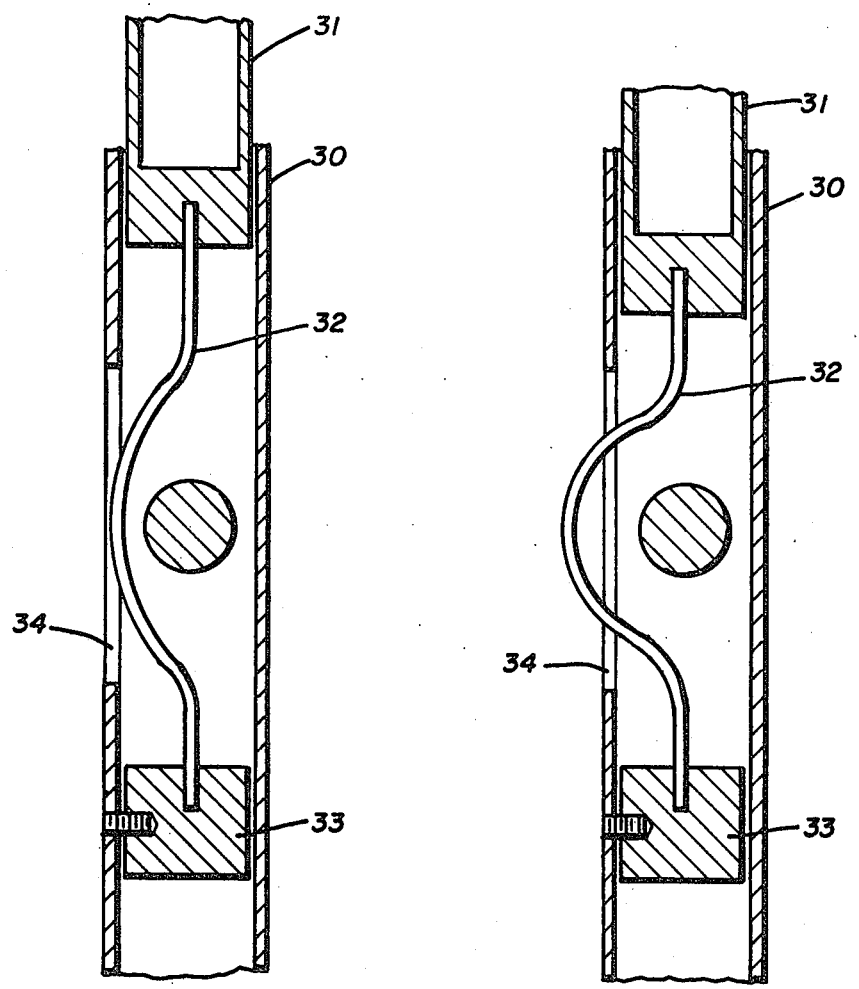
FIGS. 7 and 8 are sectioned elevations showing actuation of an alternate form of spring.

The form and arrangement of spring 20, disclosed in FIGS. 5 and 6, are preferred embodiments of the present invention. However, other forms and arrangements may be provided for spring 20 which can be effectively actuated by downward movement of push rod 17 to project a portion of the spring through the tube aperture and exert the required force on the adjacent fuel assembly. What FIGS. 5 and 6 represent generally, as well as specifically, is the embodiment of the invention wherein the spring is mounted on the wall of the square corner tube and the push rod travel down the tube to engage, distort, and project the spring laterally from within the tube. Alternatively, the spring structure may be mounted upon the push rod, itself, and be actuated laterally. FIGS. 7 and 8 are established to disclose a form and arrangement to represent this concept of the spring mounted on the push rod.

FIGS. 7 and 8 are before-and-after representations of the push rod, spring, and tube arrangement. A specific mounting of the spring structure is disclosed on the end of the push rod, although it is readily conceivably that one or more springs could be mounted at specific locations along the rod and be actuated through respective apertures in the wall of their tube.

In FIGS. 7 and 8, a square corner tube 30 is disclosed in cooperation with push rod 31 which travels down the tube. Leaf spring 32 is mounted by its upper end to the lower end of push rod 31. A pre-set bow is provided at the mid-section of spring 32. A hard stop 33 is provided below the aperture 34. Thus, in FIG. 7, the stage is set for the push rod to be moved downward until the lower end of spring 32 engages the hard stop 33, downward movement thereafter of the push rod bowing the mid-section of the spring until it projects through the aperture and into the all-important contact with the surface of an adjacent fuel assembly.

If a single spring structure is required along the length of the square corner tube, the arrangement of FIGS. 7 and 8 is feasible. It is quite simple to visualize the arrangement of FIG. 7 shifted to the arrangement of FIG. 8 to provide the lateral spring extension which carries out the objectives of the invention. Multiple springs mounted on the push rod are possible, but it would serve no purpose to depict them in detail. FIGS. 7 and 8 adequately dramatize the concept of the spring structure mounted on the push rod, itself, alternate to the spring structure mounted on the tube wall, as disclosed in FIGS. 5 and 6.

CONCLUSION

There may be some virtue in restating what is now obvious from the disclosure. With all of the specific dimensions and materials noted in constructing the present embodiment, the overall concept must not be lost to view. The simple objectives must not be obscured by the details of the preferred embodiment.

The core of a nuclear reactor is made up of many parts subjected to hydraulic, thermal and seismic forces which tend to displace the spatial relationships between the components. The present invention is conceived to resist this displacement at the interface between the fuel assemblies. More specifically, the present invention provides bracing with resilient spring structures.

The sites of the spring structures are along the lengths of the fuel assemblies. Again, more specifically, tubes are mounted at the corners of the assemblies and apertures judiciously spaced along the lengths of these tubes through which spring structures are moved laterally into engagement with neighboring assemblies. The heavy upper structures positioned down upon the top of the core actuate the spring structures so that when all is in place within the vessel, the springs "elbow" the neighboring assemblies into a unified whole which is resistant to the expected cycle of forces.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. An assembly of nuclear fuel rods arranged in the path of water to be heated, including,
    a framework for vertically supporting an assembly of nuclear fuel rods and having a square cross section,
    a tube mounted at each corner of the framework in parallel with the fuel rods of the assembly,
    at least one aperture in the wall of each corner tube directed toward the external surface of a corner tube of an adjacent fuel assembly,
    spring structure mounted within each corner tube actuatable to extend through at least one of the tube apertures into loading engagement with the external surface of the corner tube of the adjacent fuel assembly,
    a rod extended down each corner tube in engagement with the spring structure mounted within the tube to actuate the spring structure,
    and a connection between the rods and an upper guide structure to position the rods downward in their spring structure actuation when the upper guide structure is in its operative position.

2. The assembly of claim 1, in which,
    the spring structures are mounted on their corner tubes.

3. The assembly of claim 1, in which,
the spring structures are mounted on the rods.

4. The assembly of claim 1, in which,
the spring structures are in leaf form and are extended through their apertures by being buckled at a portion intermediate their ends.

5. The assembly of claim 1, in which,
each of the corner tubes is provided with a square cross section.

6. The assembly of claim 1, in which,
the apertures of each corner tube are directed toward a neighboring fuel assembly which is adjacent one side of the corner tube.

7. An assembly of nuclear fuel rods formed with a cross section of square configuration in the order of 8" to a side, including,
a framework for the assembly having at least one spacer grid and formed of zircaloy,
a tube of zircaloy having a square configuration at each corner of the assembly and extending the length of the assembly with a wall thickness in the order of 24 mil,
an aperture in the wall of each corner tube facing outward from the assembly toward the surface of a corner tube of an adjacent assembly,
a flat spring body of AM-350 stainless steel having a thickness in the order of 25 to 35 mil at its mid-section actuatable to be bowed to protrude laterally from the tube aperture and into engagement with the surface of the corner tube faced by the aperture,
a cylindrical rod arranged to extend down each corner tube to actuate the spring body in that tube,
and a link between the upper end of the rods and the upper guide structure which will cause the rods to be positioned downward in their tubes to actuate their respective springs when the upper guide structure is in its operative position.

* * * * *